Feb. 22, 1966  F. JAMNIK ET AL  3,236,617
PROCESS AND EQUIPMENT FOR THE PRODUCTION OF CONTINUOUS
BUILDING ELEMENTS OF GLASS
Filed Oct. 24, 1961  2 Sheets-Sheet 1

Inventors
Fridolin Jamnik
and Adolf Pelzl
by Michael S. Striker
Attorney

Feb. 22, 1966     F. JAMNIK ET AL     3,236,617
PROCESS AND EQUIPMENT FOR THE PRODUCTION OF CONTINUOUS
BUILDING ELEMENTS OF GLASS
Filed Oct. 24, 1961     2 Sheets-Sheet 2
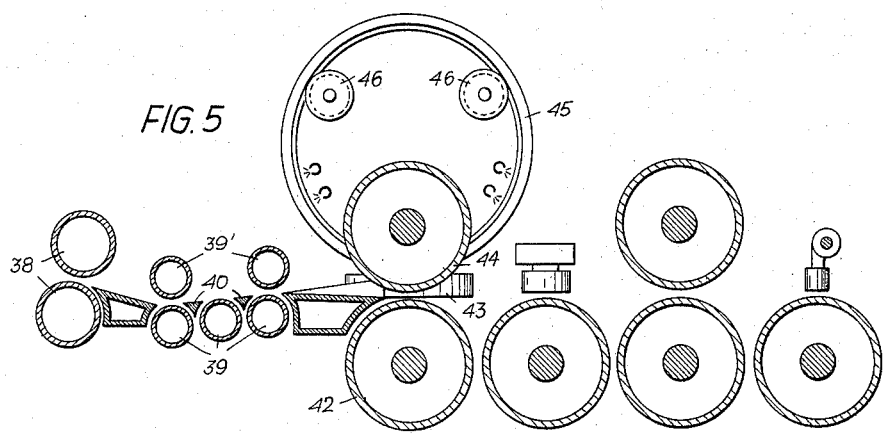
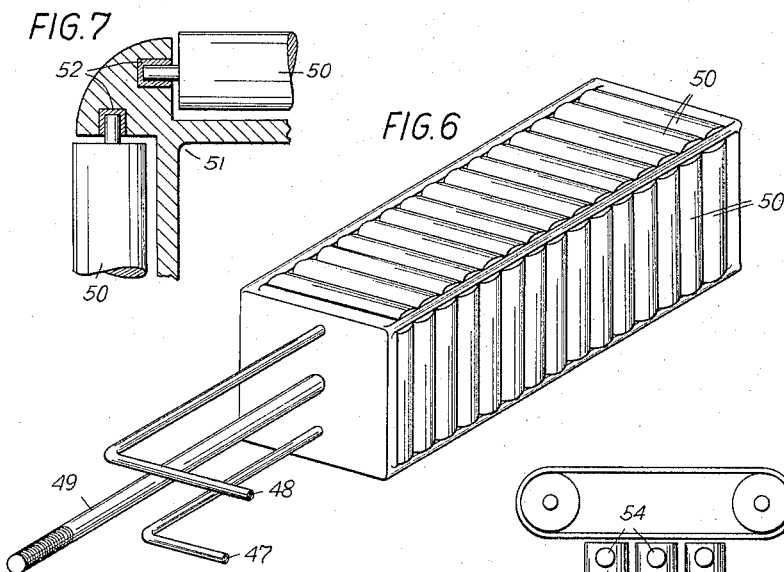
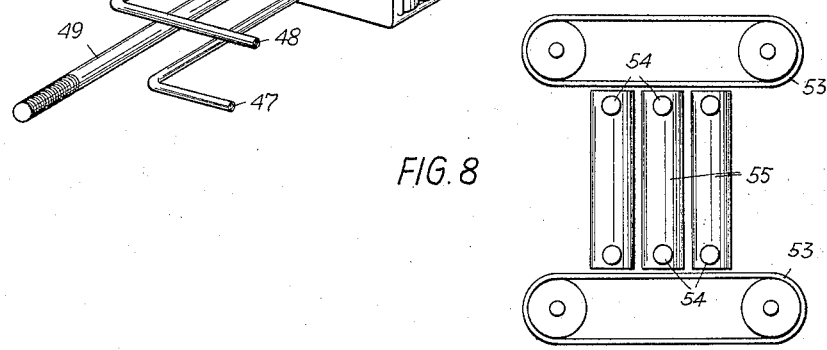
Inventors
Fridolin Jamnik
and Adolf Pelzl
by Michael S. Striker
Attorney

United States Patent Office 3,236,617
Patented Feb. 22, 1966

3,236,617
PROCESS AND EQUIPMENT FOR THE PRODUCTION OF CONTINUOUS BUILDING ELEMENTS OF GLASS
Fridolin Jamnik and Adolf Pelzl, Vienna, Austria, assignors to Moosbrunner Glasfabriks-Aktiengesellschaft, Vienna, Austria
Filed Oct. 24, 1961, Ser. No. 147,328
Claims priority, application Austria, Nov. 10, 1960,
A 8,389/60
6 Claims. (Cl. 65—51)

With regard to the continuous production of shaped glass for purposes of the building trade, methods are known to feed rolled glass in a still plastic condition to shaping means and to cool it and remove stress after shaping.

Also methods are known to shape glass bands to form corrugated glass. A relevant process is working with a discontinuous table equipment, i.e. that at any time separate plates only will be shaped by crosswise operation. Shaping is achieved by two shaping elements acting from above and below, the lateral extremities not being controlled. Such plates, however, require cutting of all their edges after shaping and, consequently must be subject to subsequent finishing.

According to another proces corrugated glass is produced continuously, i.e. the corrugations are produced crosswise to the direction of production. In this process not all the parts of the glass band are in contact with the shaping means, so that we cannot speak of a guided shaping process. In addition to this, the said process supplies semi-finished products only which require subsequent cutting of all their edges to the desired dimensions. Moreover, the shaping equipment is operating in a discontinuous way, so that the rhythmic shaping operation and the elongations of the glass band occasioned thereby are causing variations in width.

According to another process it is suggested to produce glass plates for roofings according to the table process. The individual plates are provided with even or conical grooves. During this shaping operation variations of section appear in the area of the grooves which are not without influence on the strength of the plate. Furthermore, the shaping roller has different fiameters gliding at different speeds over the glass plate below. This necessarily results in cracks in the surface skin of the glass plate, so that this process is not suitable for a continuous operation.

Another proces is known according to which rolled raw glass bands are gradually shaped at a certain temperature to form channels or tubes under the influence of gravity. These channels or tubes produced according to this previous process may not be used without subsequent finishing.

It is known to produce corrugated glass in longitudinal direction, i.e. in the direction of flow of the raw glass band. In this process, too, variations of section are unavoidable. Accordingly, it is impossible to produce of a flat glass band of a certain width a corrugated band of the same width and thickness. Moreover, the shaping means engaging from above and below, and lower rigid shaping means and e.g. balls engaging from above respectively destined to produce the corrugation exert friction on the still rather plastic glass to an extent that considerable variations of length and, consequently, of thickness will appear. Among other things, the part of the glass band gliding over the wave crest will be thicker than that pressed into the trough. The edges and borders respectively of the glass band are not influenced by this process either and, consequently, because of their sine-longitudinal-shape and inherent stress necessitate subsequent cutting.

Methods are also known to bend one longitudinal edge of flat glass plates at angles. Such plates, too, need subsequent finishing, especially by cutting their borders.

Any cutting of borders means a certain weakening of the parts of the glass adjacent to the cuts since, on the one hand, the cutting edges are frequently the starting point of cracks and fractures and, on the other hand, the stressed surface skin of the glass is destroyed.

Finally, processes have been developed allowing to cut and/or stamp various objects off still plastic glass bands by means of stamping or punching tools. Objects produced according to those working methods are semi-finished products as well, which necessitate more or less complicated finishing.

The subject invention undertakes to provide processes and equipment for realizing them, in order to produce new kinds of building elements needing no finishing, by application of the principle of circumferentially simultaneously rolling friction and avoiding all the inconveniences indicated above. While hitherto the feed rollers had been arranged flush, the subject invention makes use of several pairs of feed rollers arranged in different planes.

The subject invention solves the proposed task in the way that two or more preshaped flat and/or profiled glass bands continuously fed in a still plastic condition from one or more planes are finally shaped by deflector and support means and the circumferential influence of rolling friction at a speed proportionate to that of the finished product, thereby avoiding any variations of section and maintaining the necessary viscosity, and combined under constant heat supply, and durably assembled.

Furthermore, in solving the proposed task the individual glass profiles are assembled to form at least one unit, by means of a caliber formed by rolls and substantially closed, circumferentially enclosing the glass, under thermic influence, preferably by temperature increasing means.

According to the process covered by the invention also bands of different dimensions and/or profiles may be shaped to units at the same time, by continuous operation.

The flat glass and/or profiled glass bands may pass shaping means in due course of production according to the invention.

In view of the aims of the invention either all or optionally some preshaped continuous band elements are combined and assembled.

In order to obtain faultless finished products the continuous glass elements before being assembled are guided by guide elements preventing any irreversible deformations.

It is essential that the operations according to the subject invention are carried through under continuous influence of heat to maintain the necessary viscosity of the glass during the whole process.

The parts of the shaping means in contact with the glass must substantially have the same advance speed as the glass at the respective point and surface in contact with them.

The subject invention creates finished form building elements by combining and durably assembling of flat glass/or profiled glass bands by applying rolling friction over one or more roller mandrels.

For realizing the processes according to the invention shaping means are used, which consist of devices and installations transmitting circumferential rolling friction.

The installations for realizing the processes according to the invention are equipped optionally or in combination, with guide mechanisms, curved tracks, rolls, roller and plate conveyors and combinations of these equipments respectively, as means exercising a guiding function, which have the same advance speed as the glass.

The guide mechanisms are arranged swivelling, before and/or after the shaping means.

The devices forming a caliber and transmitting rolling friction in due course of production according to the object of the invention preferably act in pairs at least.

The calibration roller-type-mandrels provided for the realization of the processes according to the invention are movable and adjustable in longitudinal direction, in relation to the counter-rollers and to the pressure transfer and limiting means respectively.

According to the process covered by the invention it is possible, by using one or more pairs of feed rollers supplying one band of desired dimensions each, to subject those bands to preshaping operations and to create from the elements obtained with this the desired finished form building elements in due course of production, which reliably resist the increased stress in the modern building trade.

The invention is explained by the drawings on hand of examples of embodiments, its inherent advantages being discussed at the same time.

FIG. 5 is a special embodiment of a preshaping equipment in longitudinal section.

FIG. 6 is an axonometric view of an embodiment of a calibration roller-type-mandrel.

FIG. 7 is a corner detail of the calibration roller-type-mandrel shown in FIG. 6, in cross-section.

FIG. 8 is a special type of compensation and guide mechanism.

Figure 1:
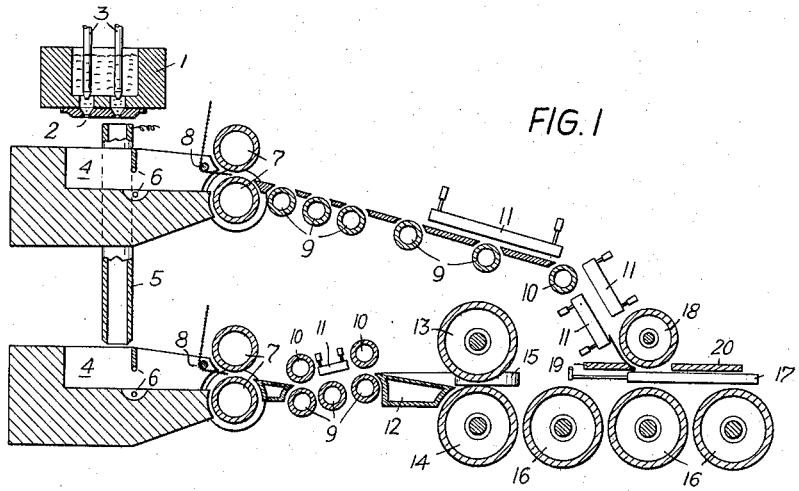
FIG. 1 is a longitudinal section of an equipment according to the invention.

In accordance with the process covered by the invention the molten glass is fed within an installation as shown in FIG. 1, over the channels 1 to the two outlets and nozzles 2 respectively, the section of which and, accordingly, the quantity of glass passing through is controlled by the plunger 3. The glass discharged from one of the nozzles 2 flows into the receivers 4. Because of the receivers being arranged in different planes, it is necessary to provide for an equalisation of temperature, e.g. by leading the glass bands falling lower down through electrically heated tube furnaces 5. Considering that the glass band may be given various thicknesses, it is necessary to variate the rolling temperature within wide limits. This is achieved by the installation of electrodes 6 arranged in pairs. After passing this heating zone the glass is fed on to the feed rollers arranged in pairs 7, before which feeding devices 8, e.g. for metal inserts, may be arranged. The glass bands obtained in this way then pass over swivelling conveyor rollers 9 and deflector rollers 10, between which heating elements 11 or other means securing a suitable temperature control and influence on the shape are arranged as required over the whole width of the profile, and on to the shaping means 12, 13, 14, and 15. The element obtained is led over the conveyor rollers 16 to the calibration roller-type-mandrel 17, over which—e.g. from above—a band is fed by means of the roller 18 and combined with the preshaped element. This is done e.g. by using the burners 19 and 20.

Figure 2:
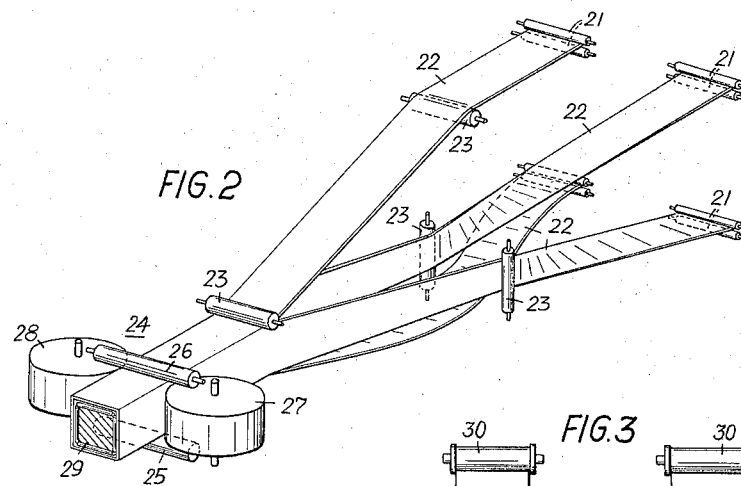
FIG. 2 is a schematic view of the production and combination of four glass bands to form a hollow-type profile.

It is also possible to arrange several, e.g. even four feed roller pairs as shown schematically in FIG. 2, viz. substantially horizontally, but in different planes, various production devices being provided in their direction of flow. The glass bands 22 obtained in due course of production according to FIGS. 1 and 2 pass over the schematically shown conveyor and defector rolls 23 to the assembling post 24, the rollers 25, 26, 27 and 28 being arranged circumferentially. In order to secure an exact internal shape, a roller-type-mandrel 29 is provided at the position 24, as specifically shown in FIGS. 6 and 7. This calibration mandrel fitted with rolls 29 supports the building element till the glass will have hardened.

Figure 3:
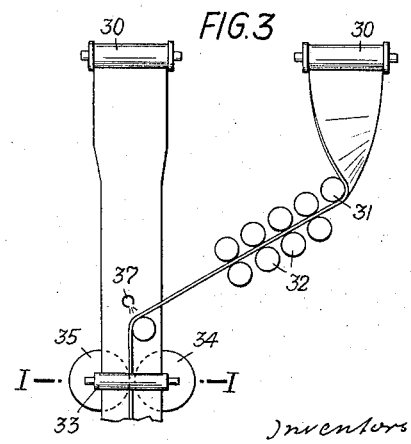
FIG. 3 is a schematic view of the production and assembling of three preshaped bands to form a building element.
Figure 4:
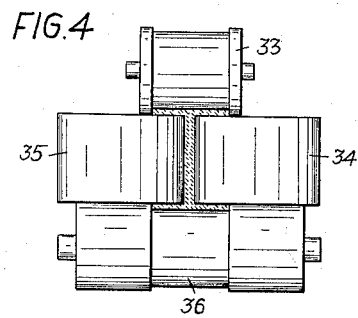
FIG. 4 is an enlarged sectional view of the equipment shown in FIG. 3, along the sectional plane I—I.

The assembling of e.g. three glass bands, as shown in FIG. 3, is achieved by feeding these bands over feed rollers 30, deflector and conveyor rolls 31 and 32, on to the shaping rollers 33, 34, 35, and 36 which—as shown in a sectional view in FIG. 4—again are forming a caliber closed on all sides. In an analogous way, in this device, too, the processing temperatures of the individual bands are controlled by using the heaters 37.

FIG. 5 shows an example of an embodiment of the shaping device at which the glass is fed over feed rollers 38, conveyor and deflector rollers 39, 39' over bridges 40 and a preshaping ramp 41 on to the preshaping devices 42, 43, 44, 45, and 46.

In order to meet the requirements of production, especially concerning the prevailing temperatures, the roller-type-mandrel used for shaping hollow type profiles of glass, must be equipped with a cooling water supply 47, a cooling water discharge 48, support and adjusting spindles 49, and support rolls 50, as shown in FIG. 6; support rolls 50, a—e.g. water cooled-housing 51, and moulded-in graphite bearings 52 according to a detail shown in FIG. 7 being provided.

For supporting the profile sides of the preshaped glass band endless steel bands or links or rolls or plate chains 53, internal support rolls 54 which may be raised, and laid down respectively if necessary, and bottom rollers 55 are provided, as shown in FIG. 8.

The above is meant to describe by way of example only the processes and arrangement of equipment, installations and expedients used for realizing the processes.

The number of the flat or profiled glass bands combined according to the proposed process to form building elements may be increased as required and the devices used during the shaping operations may be applied individually, in series or in any combination and variation required.

In the way described above it is now possible to shape individually or separately produced preshaped bands to form building elements needing no finishing and thus meeting all requirements by their static resistance.

The embodiments of the invention in which an exclusive property or privilege is claimed are defined as follows:

1. A method of forming elongated building elements from glass in a continuous process, comprising the steps of rolling at least one pair of flat glass bands; feeding said bands toward each other and inclined with respect to each other in direction transverse to the feeding direction so that the longitudinal edge portion of one band engages a transverse surface portion of the other band, while maintaining said bands during the feeding thereof in plastic condition; and subsequently rollingly engaging all surface portions of said bands located in the region of said engaged portions so as to unite said bands at said portions thereof which engage each other without distorting said bands.

2. A method of forming elongated building elements from glass in a continuous process, comprising the steps of rolling at least one pair of flat glass bands; feeding said bands toward each other and inclined substantially at right angles with respect to each other in direction transverse to the feeding direction so that the longitudinal edge portion of one band engages a transverse surface portion of the other band, while maintaining said bands during the feeding thereof in plastic condition; subsquently rollingly engaging all surface portions of said bands located in the region of said engaged portions so, as to unite said bands at said portions thereof which engage each other without distorting said bands; and cooling said united bands.

3. A method of forming elongated building elements from glass in a continuous process, comprising the steps of rolling at least one pair of flat glass bands; feeding said bands by feeding roll means at a predetermined speed in one direction toward each other and inclined in direction transverse to the feeding direction substantially at right angles with respect to each other so that the longitudinal edge portion of one band engages a transverse surface portion of the other band while maintaining said bands during the feeding thereof in plastic condition; subsequently rollingly engaging all surface portions of said bands located at the region of said engaged portions so as to unite said bands at said portions thereof which engage each other without distorting said bands; and maintaining the surface speeds of all roller means substantially at said predetermined speed.

4. Apparatus for forming elongated building elements from glass in a continuous process comprising, in combination, two pairs of roller means for rolling a pair of flat glass bands; two groups of feed roller means mounted spaced from each other with the roller axes of one group inclined with respect to the roller axes of the other group for respectively feeding said rolled bands along two paths toward each other with said bands inclined in direction transverse to said paths so that the longitudinal edge portion of one band engages a transverse surface portion of the other band; heating means arranged adjacent said rollers of said two groups of feed roller means along said two paths for maintaining said bands during the feeding thereof in plastic condition; and two shaping roller means downstream of said feed roller means at the location where said bands engage each other for pressing said engaged portions of said bands against each other for uniting said bands at said portions thereof, said two shaping roller means rollingly engaging all surface portions of said bands adjacent said engaged longitudinal edge portion of said one band and said transverse portion of said other band.

5. Apparatus for forming elongted building elements from glass in a continuous process comprising, in combination, a plurality of pairs of roller means for rolling a plurality of flat glass bands; a plurality of groups of feed roller means mounted spaced from each other with the roller axes of one group inclined with respect to the roller axes of the other group for respectively feeding said rolled bands along a plurality of paths toward each other with said bands inclined in direction transverse to said paths in such a manner that longitudinal edge portions of said bands engage each other with the engaging bands extending inclined with respect to each other to form a tube of polygonal cross section; heating means arranged adjacent said rollers of said groups of feed rollers along said paths for maintaining said bands during the feeding thereof in plastic condition; and two shaping roller means downstream of said feed roller means at the location where said bands engage each other for pressing said engaged portions of said bands against each other for uniting said bands at said engaged portions thereof, said two shaping roller means rollingly engaging all surface portions of said bands located adjacent said engaged longitudinal edge portions thereof, one of said shaping roller means including a central roller type mandrel arranged in the interior of the polygonal tube and the other of said shaping roller means including a plurality of outer rollers for respectively engaging the outer surfaces of said tube.

6. An apparatus as set forth in claim 5 in which said central roller type mandrel includes a housing forming a hollow prism; bearing means extending along longitudinal edges of said prism; a plurality of rollers mounted in said bearing means for rotation about the axis thereof, said rollers being arranged in groups, the rollers in each group being arranged closely adjacent to each other with the axes thereof parallel to each other and normal to the longitudinal edges of said prism, and said groups being respectively arranged along the side faces of said prism; conduit means for feeding cooling water into the interior of said hollow prism and for discharging cooling water therefrom; and means for supporting said hollow prism adjustable in longitudinal direction thereof.

References Cited by the Examiner
UNITED STATES PATENTS

| | | | |
|---|---|---|---|
| 1,984,924 | 12/1934 | Fox | 65—145 |
| 1,984,942 | 12/1934 | Owen | 65—145 |
| 2,116,297 | 5/1938 | Aurien | 65—55 |
| 2,300,528 | 11/1942 | Sherts | 65—356 X |
| 2,502,312 | 3/1950 | Danner | 65—184 |
| 2,970,405 | 2/1961 | Giffen | 65—107 X |

FOREIGN PATENTS

| | | |
|---|---|---|
| 1,171,875 | 10/1958 | France. |

DONALL H. SYLVESTER, *Primary Examiner.*